United States Patent [19]
Kelly, Jr. et al.

[11] 4,439,069
[45] Mar. 27, 1984

[54] METHOD AND APPARATUS FOR DISPOSING OF DRILL CUTTINGS AT AN OFFSHORE LOCATION

[75] Inventors: John Kelly, Jr., Arlington, Tex.; Gregory J. Edelbrock, Forus, Norway

[73] Assignee: Mobil Oil Corporation, New York, N.Y.

[21] Appl. No.: 329,856

[22] Filed: Dec. 11, 1981

[51] Int. Cl.³ .................... E02B 17/00; E21B 21/00
[52] U.S. Cl. ..................... 405/195; 175/66; 175/207
[58] Field of Search .............. 405/52, 195; 175/5, 175/66, 206, 207; 193/12

[56] References Cited

U.S. PATENT DOCUMENTS

| | | | |
|---|---|---|---|
| 1,014,262 | 1/1912 | Schwab | 193/12 |
| 3,693,733 | 9/1972 | Teague | 175/66 |
| 4,209,381 | 6/1980 | Kelly | 175/66 X |
| 4,242,146 | 12/1980 | Kelly | 175/206 X |

*Primary Examiner*—David H. Corbin
*Attorney, Agent, or Firm*—Alexander J. McKillop; Michael G. Gilman; George W. Hager, Jr.

[57] ABSTRACT

A method and system for discharging oil-contaminated drill cuttings into a marine environment includes a discharge member forming a continuous slide in which there is no free fall impact of the drill cuttings with hard objects that could cause break up or disintegration of the drill cuttings.

1 Claim, 2 Drawing Figures

METHOD AND APPARATUS FOR DISPOSING OF DRILL CUTTINGS AT AN OFFSHORE LOCATION

In a rotary drilling operation, a fluid commonly called "mud" is circulated from a storage area on the surface, downward through the drill pipe, out openings in the drill bit, and upward within the borehole to the surface. This return mud carries with it the drill cuttings from the bottom of the borehole. The returning mud along with its entrained drill cuttings is passed onto a "shale shaker" before it is returned to the storage area. The shaker, which normally sits above the mud storage area, is essentially a screen that is used to separate the drill cuttings and cavings from the mud. The mud falls by gravity through the screen and the cuttings pass over the end of the screen.

Disposal of these separated cuttings is sometimes a real problem, e.g., where the drilling operations are carried out at an offshore location. In some instances, the cuttings are passed from the shaker back into the water and are allowed to settle to the bottom. However, as is often the case, when a drilling mud system such as an oil-base mud is used which coats the cuttings with undesirable contaminants, e.g., oil, the cuttings cannot be disposed of directly into the water without the risk of polluting the area around the drilling site. Although the disposal of contaminated drill cuttings is complicated at an offshore location, it may also be a major problem at onshore locations where ecological considerations prevent the normal disposal of untreated cuttings.

There are two general techniques for treating these contaminated cuttings to make them ecologically acceptable. Either they must be hauled or barged to disposal facilities on shore or they must be treated on site to remove the contaminants before they are disposed of in the water. The added expense involved in hauling the cuttings ashore is substantial, and accordingly, seriously detracts from widespread commercial application of this technique. Further, the technique of hauling of the cuttings to shore for disposal may be impractical in areas of bad weather and rough seas. Therefore, for obvious reasons, it is much preferred to treat and dispose of the drill cuttings from offshore operations directly at the drilling site.

To treat contaminated cuttings onsite, different types of methods have been proposed. One approach is to burn oil off the cuttings with high intensity lamps. However, this approach presents problems (i.e., possible fire hazards due to the lamps and the difficulty of equally exposing all the cuttings to the lamps) which makes it unfeasible in most instances.

Another approach involves washing the cuttings with a detergent to remove the contaminants, separating the washing solution and contaminants, and dumping the clean cuttings into the water. One example of this approach is disclosed in U.S. Pat. No. 3,688,781 to William A. Talley, Jr.

In a further approach as set forth in U.S. Pat. No. 4,209,381 to John Kelly, Jr., the contaminated cuttings are separated from the drilling mud and passed to a heating unit where they are sprayed with steam to flash distill the oil from the cuttings. The distilled oil and the spent steam are passed to a cooling unit where they are condensed before being passed to a water-oil separator.

In a yet further approach, as set forth in U.S. Pat. No. 4,242,146 to John Kelly, Jr., the drill cuttings are sufficiently ground and mixed so that the contaminated oil is absorbed into the additional solid oil absorbent material of the cuttings themselves as exposed through the grinding. The ground and mixed cuttings are then compacted into pellets or briquettes before disposal to insure that the cuttings will safely sink to the bottom of the water into which they are disposed.

While such treating processes may be successful in minimizing the environmental impact of the disposal of drill cuttings, a reliable method and system for discharging the processed cuttings directly into the water is required.

In each of the foregoing described processes, the treated cuttings may be dropped directly into the water through a vertically disposed member which allows free fall of the cuttings. Such discharge means can, in many instances, be unsatisfactory from an environmental standpoint. Any free fall of the cuttings increases the liklihood that impact of the cuttings with the water interface or with hard objects, such as discharge pipe joints and bends or even the drill platform and its surrounding pilings, will cause break-up or disintegration of the cuttings into finer material that could contaminate the water surrounding the platform.

It is, therefore, a specific feature of the present invention to provide for a method and system by which such treated cuttings can be discharged into the water surrounding a drill platform in an environmentally satisfactory manner.

SUMMARY OF THE INVENTION

In accordance with the present invention there is provided a method and system for disposing of oil-contaminated drill cuttings from a drill platform of an offshore well drilling operation in which a drilling fluid is circulated to remove drill cuttings from the well being drilled. The oil-contaminated drill cuttings, after separation from the drilling fluid, are treated to minimize water pollution when the drill cuttings are discharge into the water surrounding the drill platform. A discharge member conveys treated drill cuttings toward the water along a pathway having an inclination from the vertical. The inclination of the pathway causes the drill cuttings to continuously slide toward the water, thereby eliminating free fall impact of the discharged drill cuttings with hard objects, such as the drill platform or the joints and bends in the discharge member itself.

In a further aspect, the discharge member may be straight running along a portion of its length to discharge the drill cuttings at some distance from the drill platform to eliminate impact of the cuttings with the underwater support structure for the platform. The discharge member may also be looped along a portion of its length.

In a still further aspect, a portion of the discharge member may be oriented vertically between the drill platform and the water and includes an internal loop-like configuration to form an internal screw-like slide or an internal corkscrew-like slide.

DESCRIPTION OF THE PREFERRED EMBODIMENT

Figure 1:
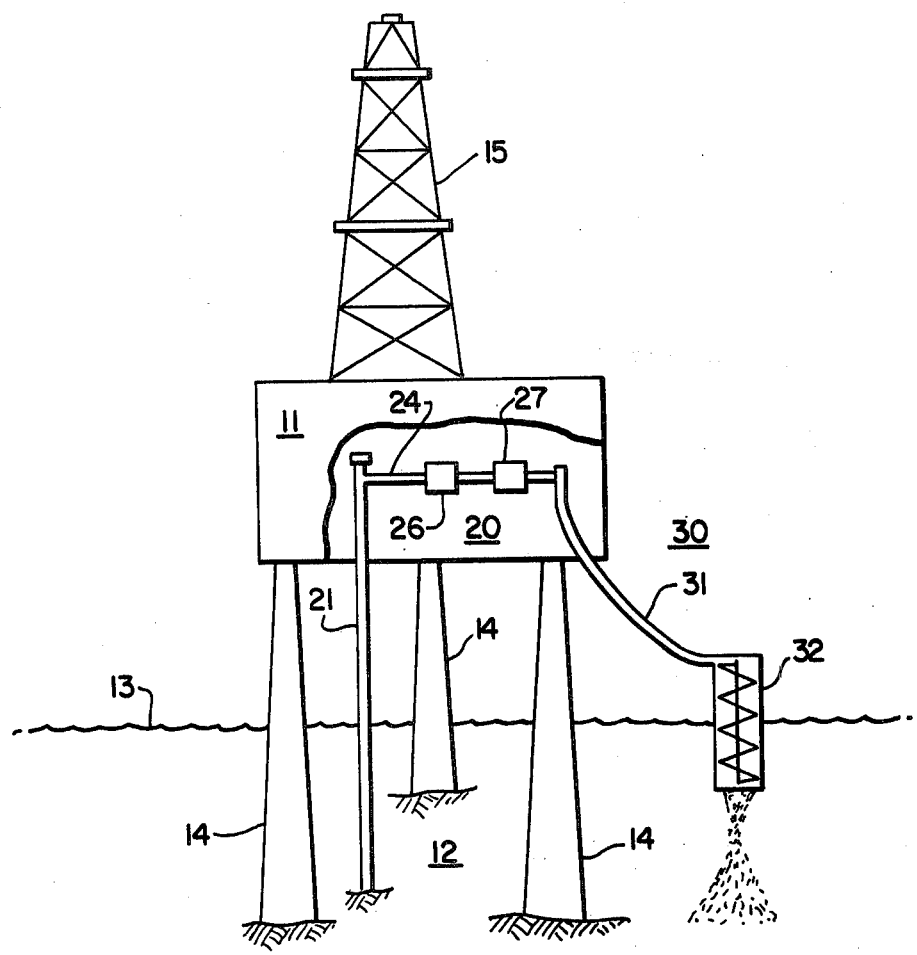
FIG. 1 is a perspective view, partly in section, of an offshore drilling platform incorporating the present invention.

Referring to FIG. 1, a typical offshore drilling rig 10 has a platform 11 supported on marine bottom 12 of the body of water 13 by means of legs 14. A derrick 15 is mounted on platform 11 which is used to carry out normal rotary drilling operations. Although a fixed platform is shown for illustrative purposes, it should be realized that the present invention can be used equally as well with other offshore drilling apparatus, e.g., floating drilling vessels or submergible barge platforms.

In rotary drilling operations, a fluid, commonly mud, is circulated into and out of the hold being drilled for a number of reasons, one being to carry drill cuttings out of the borehole. A typical, well known mud circulation system 20 for a rotary drilling operation is partially illustrated in FIG. 1. A conductor pipe 21 extends from platform 11 into marine bottom 12. Mud is circulated down a drill string (not shown) which is positioned in and extends through conductor pipe 21. The mud exits from the drill pipe through openings in a drill bit (not shown) on the lower end of the drill pipe and flows upward through conductor pipe 21 to mud return line 24. The mud carries drill cuttings with it back to the surface. As is well known in the art, the mud exits mud return line 24 and flows through shale shakers, desanders, desilters, hydrocyclones, centrifuges, and/or other known devices (shown collectively as 26 in FIG. 1) to separate the cuttings from the mud. The mud is then returned to a storage area (not shown) for reuse.

Where the mud being used does not coat the cuttings with any undesirable contaminants, the cuttings are sometimes returned directly to the body of water 13 or are disposed of in some other manner. However, as is often the case, a special mud system has to be employed in certain drilling operations, both offshore and onshore, which coats the cuttings with contaminants. This presents serious problems in disposing of the cuttings. For example, in offshore operations, the contaminants may wash free when the cuttings are returned to the water, thereby causing undesirable pollution problems. An example of such a mud system is one commonly called an "oil-base" mud system. The mud used in this system coats the cuttings with oil which remains adherred thereto even after the cuttings are mechanically separated from the mud. If these cuttings are returned untreated to the water, some of the oil most likely will wash off and may form an oil slick on the water. Also, in some instances, the cuttings, after separation, are "washed" with diesel or other suitable oil to remove whole mud and other chemical contaminants therefrom. However, some of the diesel or other oil is likely to adhere to the cuttings which complicates their disposal.

The contaminated cuttings, after being separated from the mud, pass to the treating unit 27 which treats the cuttings with one or more of the techniques set forth and described in the aforementioned U.S. Pat. Nos. 3,688,781; 4,209,381; and 4,242,146. It may be particularly desirable, as a final step in the treating process, to compact the mixture of cuttings into pellets or briquettes of sufficient density to sink in water as described in U.S. Pat. No. 4,242,146. These treated, and preferably compacted cuttings, pass to the discharge member 30 for conveying the treated and compacted cuttings from the drill platform to the ocean. It is a specific feature of the present invention to provide for a discharge member which allows the cuttings to enter the water without being broken up or disintegrated from impact or other contact with the discharge member itself, the drill platform, the platform support legs and pilings, or the water itself. In this manner the cuttings can be disposed of in the ocean with minimum pollution to the area around the drilling site with oil from the cuttings.

The discharge member 30 may be a vertical member for disposing of the cuttings directly downward beside the drill platform or, as illustrated in FIG. 1, may be inclined from the vertical along some portion of its pathway so as to carrying the cuttings away from the drill platform. By disposing of the cuttings at some distance from the platform, the possibility of break-up of the cuttings upon impact with the platform or the pilings around the base of the platform is eliminated.

Both the inclined and vertical portions of the discharge member 30 may comprise what is commonly termed a "sluice" to guide the cuttings toward the water. The sluice, which functions like a playground "slippery slide", has no corners or sharp bends where the cuttings could impact and break-up. The cuttings will, therefore, slide continuously along the sluice without any free fall impact with hard objects such as any pipe joints and bends of the discharge member or the drill platform thereby minimizing break-up or disintegration of the discharge cuttings which could cause oil contamination in the water around the drill platform.

In more detail, the inclined portion 31 may either be a straight running sluice or may loop around one or more times. The vertical portion 32, as illustrated in detail in FIG. 2, may include an internal loop-like configuration 34 in the form of an internal screw-like slide or internal corkscrew-like slide, which would prevent free fall of the cuttings. Preferably the slide 34 will have a pitch sufficient to allow the drilling cuttings to slide continuously without impediment. A suitable pitch may, for example, be in the range of 45° to 60°. In a further embodiment, the center post 33 may be eliminated with the slide 34 completely filling the inner portion 35 of the discharge member.

Figure 2:
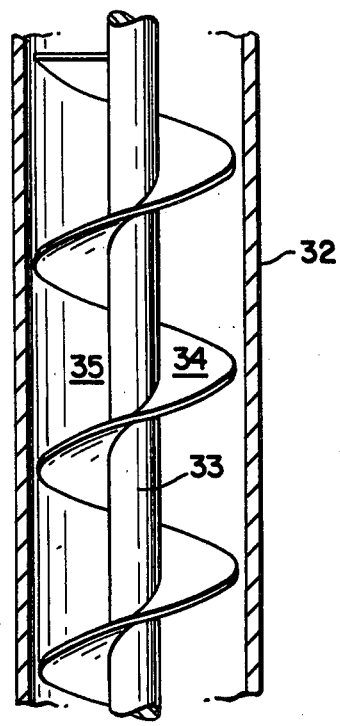
FIG. 2 is a partial sectional view of the drill cuttings discharge member of FIG. 1.

Discharge member 30 may terminate at some distance above the water surface thereby allowing some free fall of the drill cuttings into the water, or it may, as illustrated in FIG. 2, slide the drill cuttings directly into the water. By sliding the cuttings into the water, the degree of inclination will control the speed of impact of the cuttings with the water surface so as to further minimize break-up or disintegration.

As can be seen from the foregoing, the present invention provides a safe, reliable method for disposing of oil-contaminated drill cuttings into the ocean surrounding a drill platform. While particular embodiments for the discharge member have been described above, many modifications and variations may be made without departing from the spirit and scope of the invention as set forth in the appended claims.

What is claimed is:

1. A system for disposing of oil contaminanted drill cuttings from a drill platform of an offshore well drilling operation in which a drilling fluid is circulated to remove drill cuttings from the well being drilled, comprising:
  (a) means for compacting said drill cuttings to minimize water pollution when said drill cuttings are discharged into the water surrounding the drill platform, and (b) a discharge member for conveying said drill cuttings from the drill platform into the water along a pathway which is straight running and inclined 45° to 60° from the vertical along at least a portion of its length whereby said discharged drill cuttings enter the water at a distance from the drill platform sufficient to eliminate impact of the discharged drill cuttings with the underwater support structure for the platform which could cause contamination in the water surrounding the drill platform.

* * * * *